United States Patent [19]

Mizutani et al.

[11] Patent Number: 4,746,586
[45] Date of Patent: May 24, 1988

[54] SEPARATORS FOR ALKALINE DRY BATTERIES

[75] Inventors: Kazuo Mizutani; Shoichi Murakami, both of Ibaragi, Japan

[73] Assignee: Kuraray Company Limited, Kurashiki, Japan

[21] Appl. No.: 939,691

[22] Filed: Dec. 9, 1986

[30] Foreign Application Priority Data

Dec. 27, 1985 [JP] Japan ................... 60-297943

[51] Int. Cl.$^4$ ............................................. H01M 2/16
[52] U.S. Cl. ................... 429/145; 429/254; 428/311.7
[58] Field of Search ............ 429/254, 249, 145; 428/311.5, 311.7, 198

[56] References Cited

U.S. PATENT DOCUMENTS 3,914,501 10/1975 Miller et al. ............... 429/254
3,915,750 10/1975 Uetani et al. .............. 429/254

FOREIGN PATENT DOCUMENTS 0064837 11/1982 European Pat. Off. ....... 429/254
0009056 1/1985 Japan ........................ 429/254
0170159 9/1985 Japan ........................ 429/254

Primary Examiner—Donald L. Walton
Attorney, Agent, or Firm—Oblon, Fisher, Spivak, McClelland & Maier

[57] ABSTRACT

The use of a paper containing synthetic fiber not greater than 0.8 denier, particularly a paper consisting of a polyvinyl alcohol fiber not greater than 0.8 denier and a cellulosic fiber, as a separator in an alkaline dry cell is conductive to improved alkali resistance, greater alkaline electrolyte absorption, and prevention of an internal short-circuit, resulting in a marked improvement in the discharge capacity of the dry battery.

2 Claims, No Drawings

SEPARATORS FOR ALKALINE DRY BATTERIES

BACKGROUND OF THE INVENTION

1. Field of the Invention

The present invention relates to improvements in the separator interposed between the positive and negative electrodes of an alkaline manganese dry battery. More particularly, the present invention relates to a dry battery separator conducive to an improved battery performance such as an increased discharge life, prevention of internal short-circuits, and so on.

2. Description of the Prior Art

The separator which separates the positive and negative electrode active materials from each other must have the following qualities.

(1) The positive and negative electrode active substance particles should not migrate to the electrodes of opposite sign, that is to say there should not be an internal short-circuit of the cell.

(2) The separator can retain a sufficient amount of electrolyte such as KOH.

(3) The separator has good processability, e.g. form-adaptability, mechanical strength and elongation, etc.

(4) The separator as such is resistant to chemicals, not attacked by the active materials and electrolyte.

A variety of improvements have been proposed to provide separators possessing such properties in one. For example, Japanese Patent Publication No. 53-11059 proposes the combined use of a rayon fiber having a fineness of 1.5 deniers and a synthetic fiber having a fineness of 1.0 denier and states that the abovementioned requirements are fulfilled when these fibers are used in a given ratio. As is apparent from this patent literature, the fiber materials constituting the separator available today are fairly large in diameter, e.g. 1.0 to 1.5 dr or more. Separators composed of such relatively large fibers were fully satisfactory in chemical resistance and electrolyte-imbibition characteristics but as electrical appliances are made more or more compact, the sheet products made up of large-diameter fibers cannot display the expected functions. Thus, as the typical separator available today is made of large-denier fibers, it contains air spaces of the order of several $\mu$m so that particles of the positive electrode active material manganese dioxide and graphite and the negative electrode active material zinc may migrate to the electrodes of opposite sign through the air spaces to cause an internal short-circuit. To prevent this short-circuit, it is common practice to use 2 or 5 sheets together as a laminate separator. However, while such a laminar separator serves to prevent the internal short-circuit, the overall thickness of the separator becomes so large that the separator occupies a large proportion of the cell space to decrease the available space for active materials and, hence, leads to a reduced battery life. Furthermore, such a laminated separator cannot be incorporated in UM-4 and smaller dry cells and thin button-type cells for structural reasons. Thus, battery separators made of large denier fibers are unsuitable for present-day applications.

SUMMARY OF THE INVENTION

The present invention relates to a separator free of the above-mentioned disadvantages. More particularly, the invention relates to a separator which meets the demand for smaller dry batteries and which is free of the internal short-circuit problem, capable of absorbing and retaining a sufficient amount of electrolyte and superior in processability and resistance to chemicals.

In accordance with the present invention, remarkable improvements are accomplished in dry battery performance by using a separator made of fine-denier fibers not more than 0.8 dr and preferably not more than 0.5 dr in lieu of the conventional separator made of large-denier fiber.

DETAILED DESCRIPTION OF THE INVENTION

The experimental study conducted by the present inventors has shown that with an increasing proportion of fine-denier fiber in a sheet, the diameter of surface recesses of the sheet is decreased markedly and the number of recesses is also decreased. Microscopic comparison of the surface irregularities of the conventional separator and the separator according to the present invention shows that whereas the maximum recess diameter of the former is about 40 to 60$\mu$, that of the later is about 20 to 30$\mu$. Thus, the surface roughness has been reduced to almost a half in the separator according to the present invention. As the apparent density of a 30 g/m$^2$ sheet is 0.296 g/cm$^3$ in the former and 0.450 g/cm$^3$ in the latter as shown in the working example given hereinafter, the latter has a smaller void ratio and fewer air spaces within the sheet. This difference is well consistent with the microscopic findings. Thus, as the proportion of fine-denier synthetic fiber increases, the air spaces in the sheet layer are decreased to cause improvements in mechanical and chemical properties. However, finer fibers are generally inferior in electrolyte absorption.

On the other hand, cellulosic fibers, whether they are natural fibers or artificial fibers, excel in electrolyte absorption capacity and, therefore, increasing the proportion of cellulosic fiber results in an increased liquid absorption and is thus desirable but as cellulosic fibers are generally large in diameter, increasing its proportion results in a greater void volume within the sheet, thus contributing to the ease of migration of positive and negative electrode active substance particles toward the electrodes of opposite sign, as well as decreases in mechanical and chemical properties.

The present inventors found that in order to minimize the air space within the sheet and ensure sufficient electrolyte absorption and mechanical and chemical properties, it was desirable to employ a fine-denier synthetic fiber and a cellulosic fiber in a weight ratio of 15:85 to 85:15, preferably 40:60 to 60:40, and use the resulting sheet as a separator in the dry cell. The ratio is dependent on the type of dry battery, production equipment, production rate and other conditions. Generally, when a small air space is desired, the proportion of fine-denier synthetic fiber may be increased within the above-mentioned range and when the absorption and retention of a large amount of electrolyte is important, the proportion of cellulosic fiber may be increased within the above-mentioned range. If the proportion of fine-denier synthetic fiber is less than 15%, no improvement can be obtained. If it is more than 85%, the absorption of electrolyte is not sufficient.

As a preferred embodiment of the present invention, there may be mentioned a method which comprises mixing a cellulosic fiber having a comparatively large denier number with a fine-denier synthetic fiber to make a separator. It might be contemplate to reduce the weight of cellulosic fiber by using an increased beating degree and use the fiber in lieu of fine-denier synthetic fiber in the present invention but since cellulosic fiber swells and is degraded by alkali, such a separator may be able to isolate the active materials effectively for a while after manufacture but gradually loses the isolating power with the progress of time. Particularly fine cellulosic fibers are vulnerable to alkaline attack and tend to dissolve into the electrolyte KOH. Thus, the finer the cellulosic fiber, e.g. rayon fiber, in the separator, the greater is the alkaline loss.

Therefore, the practice not only fails to increase the density of the separator but rather may produce pits in the separator due to loss of the rayon fiber to thereby detract from the most important function of separating the active materials. Thus, it will lead to a short-circuit in the cell and a reduced battery life. Thus, the use of fine-denier cellulosic fiber in lieu of the fine-denier synthetic fiber according to the present invention does not produce the desired result.

In the present invention, the isolation of the battery active materials is made by a fine-denier fiber of an alkali-resistant material such as polyvinyl alcohol or polypropylene and, therefore, it does not happen that the isolation of the active materials is adversely affected with time.

The separator according to the present invention can be manufactured by blending a cellulosic fiber and a fine-denier synthetic fiber and forming the mixture into a sheet or web. As an alternative, using a papermaking machine having two or more wire cloths, a separator can be manufactured by forming two or more webs and pressing them into a unit by means of the couch roll of the machine. When a fine-denier synthetic fiber is spread on one of the wire cloths to make a high-density, void-lean web and a cellulosic fiber on the other wire cloth to form a low-density highly liquid-absorbent web and the two webs are pressed together, a separator having different characteristics on the face and reverse sides can be manufactured. In this case, for control of density of cellulosic fiber, a fibrous binder such as a polyvinyl alcohol fibrous binder, a composite fibrous binder made up of a polyethylene sheath and a polypropylene core with the sheath component melting at 110°–130° C. to function as a binder or a polyethylene fiber (for example, SWP ® manufactured by Mitsui Petrochemical) or a particulate binder such as polyvinyl alcohol powder may be added. By addition of such a binder, the thickness, paper strength, nap and other quality parameters can be easily controlled. The relative proportions of fine-denier synthetic fiber and cellulosic fiber in these layers are preferably in the same ratio as mentioned hereinbefore.

The synthetic fiber to be used in the practice of the invention includes polyolefin fibers, polyamide fibers, polyacrylonitrile fibers, polyester fibers, polyvinyl alcohol fibers, copolymer fibers based on above polymers, and conjugated fibers made of two or more polymers differing in nature. The only requirement is that such fibers should have a fineness of not greater than 0.8 denier in their final fiber form.

These fibers can be produced, for example, by extruding the respective polymers in a molten state through a spinneret designed for fine denier fibers, followed by drawing and heat treatment under conditions such that certain preliminarily designed physical properties (fineness, tensile strength, etc.) can be obtained. Modifications with respect to the degree of polymerization, crystallinity and/or molecular orientation and/or partial conjugation with a low-melting polymer or polymers may be made to thereby improve the fibers in respect of their sheet-forming property and/or fiber adherence.

The cellulosic fiber includes, among others, rayon fibers, acetate fibers, cotton linter pulp, wood pulp and hemp pulp fibers, and mercerized modifications thereof which are preferred. Such fibers may be general-purpose fibers readily available on the market; this applies not only to the fiber geometry inclusive of fineness but also to the physical properties, which are not critical.

The fine-denier synthetic fiber and rayon and acetate fibers are cut to a length of 3 mm to 30 mm, if necessary after taking an appropriate measure, for example, for providing the fiber surface with a substance having a hydrophilic group, such as a surfactant or polyethylene oxide, to thereby improve the paper-forming property.

For sheet making from such short fibers after cutting, pulp, hemp and so forth, a paper machine is used. In the practice of the invention, a paper-making machine having two wire cloth vats and a Yankee drier is used in a conventional manner in which chemical and/or synthetic fiber paper production is currently made.

The paper separator according to the invention preferably has a basis weight within the range of 24–80 g/m$^2$, a thickness within the range of 0.08–0.4 mm and a density within the range of 0.18–0.34 g/cm$^3$.

Experiments conducted by the present inventors have revealed that when a polyvinyl alcohol fiber (hereinafter sometimes referred to as "Vinylon") is used as the fine-denier synthetic fiber and combined with a rayon fiber in practicing the invention, papermaking is easiest and separators with best performance characteristics can be obtained. This is presumably due to the fact that both the fibers are hydrophilic and can be uniformly dispersed in water. This fact possibly leads to uniform pore distribution in the product sheets. Furthermore, the polyvinyl alcohol fiber is highly resistant to alkali. Therefore, it is also presumable that the fiber form change in cells after absorption of potassium hydroxide could be minimum and the discharge duration time longest as compared with other fibers.

The following examples are further illustrative of the invention.

EXAMPLE 1

Paper sheets were produced on a standard TAPPI paper machine using various fibers given in Table 1. The intended basis weight was 30 g/m$^2$. A binder fiber made of polyvinyl alcohol (Kuraray's VPB 105-2, 1 dr×3 mm, soluble in water at 60° C.) was used as a binder fiber in an amount of 10% by weight based on the total paper weight. Those paper sheets containing a synthetic fiber having a fineness of not greater than 0.8 denier were products according to the invention, while those containing a synthetic fiber having a fineness of not less than 1 denier served as controls.

For each of these paper sheets, the thickness as measured with a thickness gage under a load of 230 g/cm$^2$, the density, and the absorbency for KOH as determined after immersion in 30% KOH at ordinary temperature for 30 minutes and expressed in terms of KOH (g)/g of fiber are shown in Table 1. The tensile strength and the weight loss percentage after immersion in 30% KOH at 30° C. for 24 hours are also shown in Table 1. The weight loss percentage is defined as follows:

$$\text{Weight loss in alkali (\%)} = \frac{A - B}{A} \times 100$$

where
- A is the weight before immersion and
- B is the weight after 24 hours of immersion.

Using the respective paper samples, cup-shaped separators were prepared according to a UM-1 dry cell in size. Alkaline dry cells showing an electromotive force of 1.5 V upon filling were constructed using a nickel-plated iron positive electrode can, a kneaded mixture of manganese dioxide and graphite as the positive electrode active material, the separator impregnated with 30% KOH as an intervening element, and a mixture of a zinc powder and an alkaline electrolyte solution as the negative electrode active material, and compared with one another in respect of the time required for the voltage to drop to 1.0 V in a circuit with a resistance of 4 Ω. The results obtained are shown in Table 1. When said time was longer than 13 hours, the result was indicated by a double circle; a time between 10–13 hours was indicated by a circle; a time between 7–10 hours by a triangle; and a time shorter than 7 hours by a cross. As regards the absorbency for 30% KOH, tensile strength and weight loss on alkali treatment, measured values are given, and at the same time the separators were evaluated in these respects when they were incorporated in cells; a circle stands for "good", a triangle for "rather poor" and a cross for "very poor". Prior to papermaking, each fiber was subjected to treatment for providing the surface thereof with polyethylene oxide in an amount of 0.1% by weight based on the fiber weight to thereby improve its paper-forming property.

In Table 1, Test No. (T-No.) 1 to No. 7 constitute a higher-denier synthetic fiber group (control group) while T-No. 8 to No. 15 constitute a group (invention group) of fine-denier synthetic fibers which are the same in polymer composition as the corresponding higher-denier fibers.

The discharge duration time for the fine-denier synthetic fiber group was longer by about 30% or more than that for the higher-denier synthetic fiber group presumably for the following reasons:

(1) Since the separators belonging to the fine-denier synthetic fiber group were smaller in thickness, they occupied a smaller space in the cell can, so that the active material could be filled in the can in larger quantities;

(2) Since the separators belonging to the fine-denier synthetic fiber group were higher in fiber density and accordingly pores in the paper layer were small, the pores could not grow into through holes even upon more or less changes in size of the cellulosic component. Therefore, migration of active materials to counter electrodes could not take place, hence no internal short circuit occurred.

The improvement in discharge duration time was presumably due to a synergism between the above effects (1) and (2).

Since a reduction in size of pores in the paper layer of the separator leads to a reduction in internal short circuit incidence, the use of the separator according to the invention is expected to contribute to a reduction in percentage of defects due to internal short circuit during dry cell manufacture.

TABLE 1

| | dr × mm | T-No. 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Polypropylene | 2.0 × 5 | 50 | | | | | | | | | | | | | | |
| Polyacrylonitrile | 1.5 × 5 | | 50 | | | | | | | | | | | | | |
| Polyester | 2.0 × 5 | | | 50 | | | | | | | | | | | | |
| Polyamide | 1.5 × 5 | | | | 50 | | | | | | | | | | | |
| Vinylon | 1.0 × 5 | | | | | 50 | 50 | 50 | | | | | | | | |
| Polypropylene | 0.5 × 5 | | | | | | | | 50 | | | | | | | |
| Polyacrylonitrile | 0.8 × 5 | | | | | | | | | 50 | | | | | | |
| Polyester | 0.5 × 5 | | | | | | | | | | 50 | | | | | |
| Polyamide | 0.7 × 5 | | | | | | | | | | | 50 | | | | |
| Vinylon | 0.8 × 5 | | | | | | | | | | | | 50 | | | |
| Vinylon | 0.3 × 5 | | | | | | | | | | | | | 50 | 50 | 50 |
| Rayon | 1.5 × 5 | 50 | 50 | 50 | 50 | 50 | | | 50 | 50 | 50 | 50 | 50 | 50 | | |
| Hemp | S-2 | | | | | | 50 | | | | | | | 50 | | |
| Pulp | NBKP | | | | | | | 50 | | | | | | | | 50 |
| Basis weight g/m$^2$ | | 29.8 | 30.1 | 30.4 | 30.5 | 29.6 | 31.1 | 30.7 | 30.1 | 30.7 | 31.8 | 31.1 | 30.7 | 29.1 | 31.6 | 30.8 |
| Thickness mm | | 0.145 | 0.133 | 0.138 | 0.120 | 0.110 | 0.106 | 0.100 | 0.124 | 0.118 | 0.117 | 0.125 | 0.107 | 0.103 | 0.103 | 0.098 |
| Density g/cm$^3$ | | 0.201 | 0.226 | 0.220 | 0.254 | 0.269 | 0.293 | 0.307 | 0.242 | 0.260 | 0.271 | 0.249 | 0.287 | 0.282 | 0.306 | 0.314 |
| Absorbency for 30% KOH g/g | | 5.9 | 7.5 | 7.0 | 9.6 | 9.4 | 8.6 | 8.6 | 6.8 | 7.7 | 7.1 | 7.8 | 9.3 | 8.7 | 8.0 | 8.3 |
| Tensile strength kg/15 mm | | 2.0 | 2.4 | 2.2 | 2.2 | 2.7 | 2.9 | 3.1 | 2.3 | 2.7 | 2.3 | 2.8 | 3.0 | 2.9 | 3.3 | 3.5 |
| Loss on alkali treatment % (30% KOH 30° C. × 24 hr) | | 0.7 | 1.4 Δ | 1.9 | 1.6 | 0.2 Δ | 0.8 Δ | 1.1 | 0.2 | 0.8 | 1.3 | 1.0 | 0.1 | 0.08 | 0.4 | 0.7 |
| Charging characteristic | | X | Δ | | | | | | X | | | | | | | |

EXAMPLE 2

Various combinations of fibers as specified in Table 2 were used to produce composite paper sheets comprising a high-density layer of a synthetic fiber and a low-density layer of a cellulosic fiber using a fourdrinier paper machine (inclined paper machine type), a cylindrical paper machine and a combination machine each for experimental use. The paper sheets obtained were incorporated in dry cells in the same manner as in Example 1 and tested for performance characteristics by the same methods as used in Example 1. The results thus obtained are shown in Table 2.

In this example, too, a polyvinyl alcohol binder fiber (Kuraray's VPB 105×2, 1 dr×3 mm, soluble in water at 60° C.) was used in each layer in an amount of 10% by weight based on the whole paper weight.

TABLE 2

| | | Material | dr × mm | Unit | Invention | | | | Control | |
|---|---|---|---|---|---|---|---|---|---|---|
| Four-drinier paper machine | Synthetic fiber layer | Vinylon | 1.0 × 3 | | | | | 90 | 90 | |
| | | PP | 1.5 × 5 | | | | 90 | | | 90 |
| | | Vinylon | 0.5 × 3 | % | 90 | | | | | |
| | | PP | 0.6 × 5 | | | 90 | | | | |
| | | Vinylon binder | 1.0 × 3 | | 10 | 10 | 10 | 10 | 10 | 10 |
| | | Rayon | 1.5 × 5 | | | | | | | 90 |
| | | Single layer weight as designed | | g/m² | 15 | 15 | 15 | 15 | 15 | 15 |
| Cylindrical paper machine | | Rayon | 1.5 × 3 | | 90 | 90 | 90 | 90 | | |
| | | Cotton linter pulp | | % | | | | | 90 | 90 |
| | | Vinylon binder | 1.0 × 3 | | 10 | 10 | 10 | 10 | 10 | 10 |
| | | Single layer weight as designed | | g/m² | 20 | 20 | 20 | 20 | 20 | 20 |
| Physical properties of combination sheet | | Basis weight | | g/m² | 35.0 | 35.7 | 35.8 | 34.8 | 35.2 | 36.1 |
| | | Thickness | | mm | 0.132 | 0.146 | 0.147 | 0.153 | 0.156 | 0.158 |
| | | Density | | g/cm³ | 0.265 | 0.245 | 0.244 | 0.227 | 0.226 | 0.228 |
| | | Absorbency for 30% KOH | | g/g | 5.1 | 6.3 | 4.7 | 4.1 | 4.8 | 9.1 |
| | | Loss on alkali treatment | | % | 0.8 | 0.9 | 1.0 | 1.1 | 1.3 | 29.3 |
| | | Charging characteristic | | Hr | | | | | | X |

COMPARATIVE EXAMPLE 1

A paper sheet (basis weight 30.7 g/m², thickness 0.136 mm, density 0.226 g/cm³) the constituent fiber of which was 100% rayon (1.5 dr × 3 mm) was produced by the procedure of Example 1. This paper sheet had an absorbency for 30% KOH of 8.9 g/g and a tensile strength of 2.3 kg/15 mm and showed a weight loss of 26.7% upon alkali treatment. Cells in which said sheet was used were very poor in discharging characteristic and evaluated as no good (X) in this respect. The same binder was used in the same amount as in Example 1.

COMPARATIVE EXAMPLE 2

Paper sheets were produced by the procedure of Example 1 using rayon fibers as shown in Table 3 as the constituent fibers. The basis weight, thickness and density of each paper sheet produced are shown in Table 3. The sheets were tested for absorbency for 30% KOH, tensile strength and weight loss in alkali. They were also used as separators for alkaline dry cells. The results thus obtained are shown in Table 3. The results obtained in T-No. 5, T-No. 12 and T-No. 13 in Example 1 are also shown in Table 3 for comparison. The same binder was used in the same amount as in Example 1.

TABLE 3

| | | Comparative example 2 | | | Example 1 | | |
|---|---|---|---|---|---|---|---|
| Test-No. | | 16 | 17 | 18 | 5 | 12 | 13 |
| | dr × mm | | | | | | |
| Rayon | 1.5 × 3 | | | | 50 | 50 | 50 |
| Rayon | 0.8 × 3 | 50 | | | | | |
| Rayon | 0.5 × 3 | | 50 | | | | |
| Rayon | 0.3 × 3 | | | 50 | | | |
| Vinylon | 1.0 × 3 | 50 | 50 | 50 | 50 | | |
| Vinylon | 0.8 × 3 | | | | | 50 | |
| Vinylon | 0.3 × 3 | | | | | | 50 |
| Basis weight (g/m²) | | 30.1 | 29.1 | 28.5 | 29.6 | 30.7 | 29.1 |
| Thickness (mm) | | 0.110 | 0.106 | 0.103 | 0.110 | 0.107 | 0.103 |
| Density (g/cm³) | | 0.272 | 0.275 | 0.278 | 0.269 | 0.287 | 0.282 |
| Absorbency for 30% KOH (g/g) | | 8.5 | 8.2 | 7.8 | 9.4 | 9.3 | 8.7 |
| | | o | o | o | o | o | o |
| Tensile strength (kg/15 mm) | | 3.1 | 3.0 | 2.9 | 2.7 | 3.0 | 2.9 |
| | | o | o | o | o | o | o |
| Loss on alkali treatment % (30% KOH 30° C. × 24 hr) | | 1.2 | 1.4 | 2.0 | 0.2 | 0.1 | 0.08 |
| | | Δ | x | x | o | o | o |
| Charging characteristic | | Δ | x | x | o | | |

In Table 3, the sheet of T-No. 5 is a conventional one comprising a 1.0-dr Vinylon fiber. The sheets of T-No. 12 and No. 13 each comprising a fine-denier Vinylon fiber (i.e. 0.8 dr and 0.3 dr, respectively) are paper sheets according to the invention and are excellent in discharging characteristic.

On the contrary, the sheets of T-Nos. 16, 17 and 18 are sheets for comparison in which the rayon fiber is a fine-denier fiber. They show that the use of a fine-denier rayon fiber leads to an increase in weight loss in alkali and to a decrease in discharging characteristic. Thus, as far as rayon is concerned, it is of no use at all that the rayon fiber is a fine-denier fiber having a fineness of not more than 0.8 denier.

What is claimed is:

1. A paper for alkaline dry battery separator, said paper comprising a polyvinyl alcohol fiber having a fineness of not greater than 0.8 denier and a cellulosic fiber having a fineness of not less than 1.0 denier, the weight ratio of said polyvinyl alcohol fiber and said cellulosic fiber being in the range of 15:85 through 85:15.

2. A paper as defined in claim 1, wherein said paper is made of two wet-formed webs, one of which is made of a polyvinyl alcohol fiber having a fineness of not greater than 0.8 denier with the other web being made of a cellulosic fiber having a fineness of not less than 1.0 denier.

* * * * *